Nov. 3, 1953 — A. R. A. BEEBER — 2,658,006
MEASURING TAPE
Filed May 11, 1949 — 2 Sheets-Sheet 1
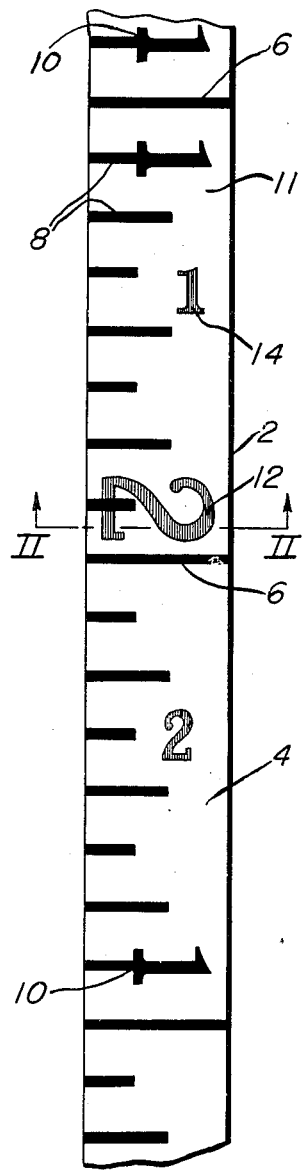
Fig. I
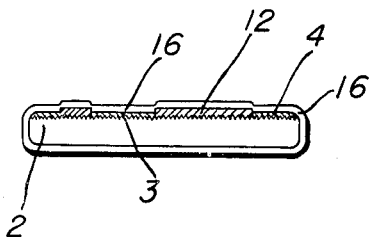
Fig. II
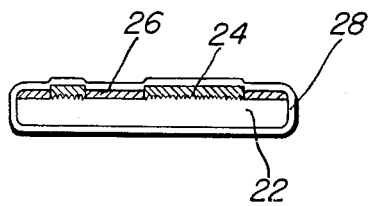
Fig. III
INVENTOR.
ALLAN R.A. BEEBER
BY
ATTORNEY Nov. 3, 1953     A. R. A. BEEBER     2,658,006
MEASURING TAPE
Filed May 11, 1949     2 Sheets-Sheet 2
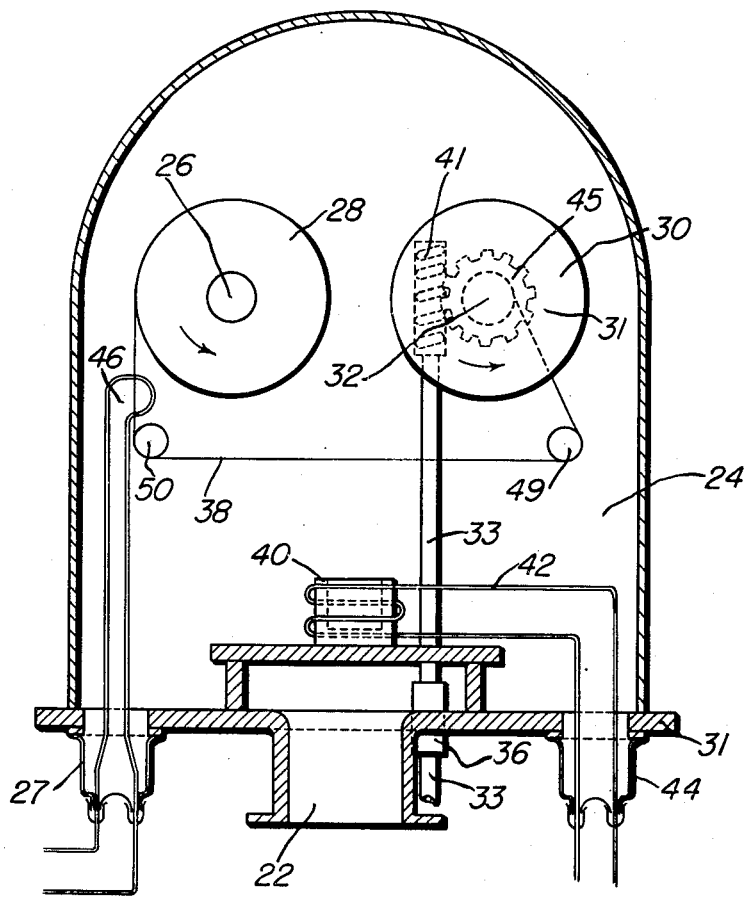
Fig. IV
INVENTOR.
ALLAN R.A. BEEBER
ATTORNEY Patented Nov. 3, 1953

2,658,006

UNITED STATES PATENT OFFICE 2,658,006

MEASURING TAPE

Allan R. A. Beeber, Matawan, N. J., assignor to Keuffel & Esser Company, Hoboken, N. J., a corporation of New Jersey Application May 11, 1949, Serial No. 92,653

1 Claim. (Cl. 117—12)

This invention relates to measuring tapes which are usually provided on the surface of a steel strip although other materials may be used as bases for such measuring tapes. In the measuring tapes known in the art, it is customary to provide a light colored background with black or darker colored graduations and indicia provided thereon. The graduations and indicia are usually provided by means of coloring or by various types of ink while the background may be provided by means of a light colored pigmented coating composition, by means of a light colored metal electroplated on the steel tape, or by etching. In some of these tapes the background material may serve the additional function of protecting the base material from corrosion.

In the class of tapes having an electroplated metal background it has been necessary to limit the metal used in the background to one which may be electroplated. This invention seeks to remove this limitation and permits the use of other metals for the background areas by teaching the use of metallic deposition in high vacuum in the manufacture of measuring tapes. By deposition in high vacuum it is possible to apply aluminum to tapes. Aluminum has a higher reflectivity and therefore offers more contrast against dark colored indicia than most metals which may be electroplated, e. g. chromium and nickel. Silver also has high reflectivity but is expensive and tarnishes very readily.

Tapes having an aluminum background and black indicia made according to this invention do not tarnish and provide a high contrast approaching that of tapes having black indicia imprinted on a background of a white pigmented synthetic coating composition. They also have good abrasion resistance. In certain applications metal tapes such as those of this invention are preferred to tapes made with a pigmented synthetic coating composition because they are more resistant to organic solvents.

It is the principal object of this invention to provide a measuring tape of the type described in which the background is formed by a metal deposited in high vacuum. The use of high vacuum makes possible the deposition of metals which are not readily deposited from an electroplating solution and because of the different nature of the process certain advantageous effects may be achieved which will become apparent from the description to follow.

Another object of the invention is to provide a measuring tape with a metallic background having greater contrast between background and lines and numbers than metallic background tapes known in the art.

These and other objects of the invention and the means for their attainment will become more apparent from the following detailed description taken in connection with the accompanying drawings which are partially diagrammatic and in which:

Figure I is a view in plan, showing a fragmentary portion of a measuring tape made in accordance with the invention.

Figure II is a view in transverse section taken along the line II—II of Figure I and showing the tape in this view for one embodiment of the invention.

Figure III is a view as in Figure II but showing a different embodiment of the invention.

Figure IV is a view in sectional elevation showing an apparatus for coating measuring tapes by evaporation of a metal.

The strip of steel is preferably pretreated and then printed with an ink or resist to provide indicia, graduations, numerals, etc. The strip is then placed in a vacuum chamber and exposed to a source of metal which may be an induction heated crucible, a resistance heated tungsten coil, a high voltage sputtering source, or other sources known in the art of high vacuum deposition. The process may be conducted so as to prevent deposition on the indicia in a manner to be more fully described or the printed indicia areas may be covered with deposited metal which is later removed. Finally the tape may be covered with a film of clear lacquer which affords added protection to the indicia and background areas.

In the embodiment illustrated in Figure I, a fragmentary portion of a steel tape 2 is shown. The background area 4 is covered with a layer of aluminum which gives it a whitish or silvery appearance. Colored unit graduations 6, fractional graduations 8 and numerical indicia 10 and 12 are provided preferably in black to contrast with the aluminum background. Though this is the preferred arrangement it will be understood that the numerals and graduations may be formed by the metallic deposit and the background by other distinguishing and contrasting material.

In the illustrated embodiment, the scale is subdivided into graduations representing feet and inches and the indicia or numerals representing inches 10 and feet 12 are all imprinted in black. The numerals representing feet units could be imprinted in still another contrasting color, say red if desired and smaller numerals 14 also may be imprinted in black or red so that the reading in units and fractions may be readily made. A border may also be provided on the tape.

To make the embodiment shown in Fig. II the surface of steel strip 2 is given a preliminary treatment to give it the surface 3. This preliminary treatment may take several forms and may have various purposes.

In general greater freedom may be exercised in the choice of a surface treatment as a base for vacuum deposition than for electroplating. It is not necessary to have a conducting surface when metal is applied by vacuum deposition. Commercial phosphating treatments may be used and the phosphated layer may be permitted to remain on the strip or may be either partially or completely removed. This phosphating treatment increases the rust proof characteristics of the finished tape, bonds the ink or printing composition and the metal applied to it to the steel strip and imparts a diffuse reflecting characteristic to the metal layer applied by vacuum deposition which increases the legibility of the tape.

Other preliminary surface treatments may be used such as a light etch which gives the same advantages as phosphating except that it does not impart rust-proofing. However an etched strip is easier to degas than a strip provided with a phosphate layer and is therefore better adapted to the vacuum process. If a phosphate layer is applied and then completely removed or almost completely removed the degassing advantage of an etched strip is obtained but the surface characteristics are more uniform than a strip which has merely been etched.

Other forms of preliminary surface treatments which may be used color the surface of the strip. Color is advantageous when the printing composition is removed from the strip after application of the metal. The printing composition may be removed as a step of the process or during normal wear of the tape. Examples of chemical coloring treatments are as follows.

The application of a concentrated solution of two parts sodium hydroxide and one part sodium nitrite at 130° C. will give the base metal a black surface that is however acid soluble. Washing and brushing the surface after treatment with the reagent is necessary.

Alternatively a colored strip may be obtained by giving the strip a nitric acid etch and then immediately after removing the strip from the nitric acid solution subjecting it to a 1 to 2% oxalic acid solution at about 85° F.

Color may also be obtained by heating the steel strip to temperatures which give what is known as a "blue temper."

The steel strip 2 preferably provided with some form of surface treatment as described is imprinted with indicia including graduation lines and numerals. The composition of the printing composition or ink may vary considerably depending on the results sought.

The printing composition may contain constituents which are slightly volatile under high vacuum conditions. If such a printing composition or ink is used the deposition of evaporated aluminum or other metal may be prevented in the imprinted indicia areas. Heating of the tape may be desirable to help to prevent deposition in these areas. The method of heating the strip will be more fully described. Many formulations for printing compositions will perform satisfactorily and prevent deposition of the aluminum or other metal. One type of ink which worked well was composed of linseed oil, a natural resin such as rosin, a pigment such as carbon black and asphalt. If the printing composition is removed in a later step of the process it will not be necessary to incorporate a pigment in it. Other modifications of the printing compositions will also be described.

In making a tape of the type shown in Fig. II, it is preferred to use a printing composition such as the type disclosed which does prevent deposition in the imprinted indicia areas. After leaving the coating apparatus, the steel strip 2 with the pretreated surface 3 is provided with ink indicia 12 and aluminum background 4. It is then only necessary to provide the tape with a topcoat of clear lacquer 16 or other protective transparent film. This may be applied by spraying, roller coating, or by immersion and withdrawal of the tape from a suitable bath. This last step may be considered optional but is desirable because it protects the tape from fingermarks, etc., and increases its durability.

In the embodiment of Fig. III the steel strip 22 is given a preliminary treatment to color or blacken it as shown at 24. A variety of coloring methods may be used but the one comprising treatment with a basic solution of a nitrite is preferred. This coloring step is ordinarily accomplished by immersion and colors both surfaces of the strip completely and evenly. The colored surface of the steel strip 22 is then imprinted with an etching resist to form the necessary indicia such as graduation lines and numerals. The printing composition may be the ink already disclosed in which the asphalt is particularly effective for imparting acid resistance. It is not necessary to include a pigment in this printing composition and if one is included it most be acid resistant; i. e., such as carbon black. Iron oxide pigments should not be used.

The pretreated and imprinted tape is then treated with a suitable reagent to remove the colored or blackened surface from the exposed areas. Scrubbing with water may be necessary to remove all black material and the strip is preferably immersed in a basic solution to neutralize excess acid. The surface characteristics of the exposed steel strip may be varied and are dependent on the reagent used to remove the colored surface layer. If concentrated hydrochloric acid is used, the exposed areas will exhibit specular reflection characteristics and if dilute nitric acid is used, the exposed areas will exhibit diffuse reflection characteristics. These reflection characteristics will also be imparted to the outer surface of the metal layer applied by deposition in high vacuum. It is also possible to recess the background areas in this step so that a mechanical image of the indicia as well as a visual one is provided in the tape.

The prepared steel strip 22 of Fig. III is coated with aluminum in vacuum apparatus so that a layer of aluminum covers at least one surface of the steel strip including areas imprinted with the resist. The coated strip is then soaked in a suitable solvent such as hydrocarbon solvent which acts through the aluminum layer to dissolve the printing composition and lift the overlying aluminum. Wiping or scrubbing is desirable to remove all the resist and loose aluminum. The steel strip 22 is now provided with colored indicia 24 against a background of aluminum 26 which may have either diffuse or specular reflecting characteristics as desired. This tape may also be provided with a clear lacquer topcoat 28.

Although aluminum has been mentioned as preferable in the examples cited, a wide variety of metals or alloys of metals may be deposited in vacuum for example, aluminum, silver, nickel and chromium any one of which may be used to manufacture measuring tapes of the type described. Certain salts or other compounds may also be deposited in vacuum and may be useful for covering either the background or indicia areas. However, aluminum is preferred because it has higher light reflectivity than any of the other metals except silver and therefore gives the best contrast between background and lines and numerals. Silver is less desirable because it tarnishes more readily than aluminum and is more expensive but may be useful in a tape wherein the metal deposit is protected with a film of clear lacquer.

Tapes of limited length may be coated in high vacuum by a batch process. For example, in coating by evaporation a considerable length of tape can be made to cover most of the inside walls of a bell jar by coiling it about a central axis of the bell jar. A tungsten coil source for evaporating aluminum is preferred in such a process. For producing greater single lengths of tape an apparatus as shown in Figure IV is preferred.

In Figure IV, means are provided to exhaust the air from the vacuum chamber 24 through the port 22. A reel of tape 28 is mounted in the vacuum chamber 24 for rotation about an axle 26. A second reel 30 spaced from the first reel 28 is mounted about an axle 32. Reel 30 is driven by a system of gears through a vacuum tight seal 36 various types of which are known in the art.

The vertical shaft 33 is driven by a motor or other means for producing rotation through the vacuum tight seal 36. The worm gear 41 carried by the shaft 33 transmits the rotation to the gear 45 which drives the shaft 32 and reel 30. The tape 38 is fastened to the reel 30 and is pulled thereby over shafts or pulleys 49 and 50 from the reel 26. Brake means which may be merely normal frictional resistance to rotation should be applied to the reel 28 or to the shaft 26 to prevent the tape from unwinding from the reel 26 faster than it can be rewound on the reel 30. To increase the production of the apparatus several pairs of reels may be used to provide a parallel arrangement of moving tapes passing above the source of evaporating aluminum.

The crucible 40 from which the metal is evaporated is conveniently situated below the moving tape or tapes 38 and is heated by an induction coil 42 which passes into the vacuum chamber through the cup 44 made of insulating material and sealed to the base plate 31 of the vacuum chamber 24. High frequency current is supplied to the coil 42 by conventional means. Heating means 46 may be provided inside the chamber to heat the tape 38 before the aluminum deposits on it in order to cause vapors to be given off from the ink in tapes which have been imprinted with lines and numerals before vacuum coating. The heating means 46 may consist of a high frequency induction coil as shown passing around the tape and generating heat directly in it. The induction coil 46 may be conveniently fed through the insulating cap 27. The vapors coming off from the ink prevent the deposition of the evaporated metal in the printed areas so that a tape as shown in Figure II would result if an imprinted steel band were loaded into the vacuum chamber. The ink and the degree of heat applied by the coil 46 should be selected so as to cause the imprinted strip 38 to give off only the minimum quantity of volatile constituents which will prevent deposition. If volatile matter is given off too rapidly the vacuum pumps will be unable to maintain a degree of vacuum suitable to permit coating by evaporation.

The embodiments shown in Figures II and III may be made in the apparatus of Figure IV as follows. The prepared steel strip is mounted on the reel 28, passed over the guides 49 and 50 and secured to the reel 30 so that the surface imprinted with indicia is exposed downwardly toward the crucible 40. The crucible 40 is heated by the induction leads 42 to vaporize aluminum. When evaporation has begun the imprinted tape is passed above the crucible 40 from the reel 26 to reel 30 and heated or not as required by the heating means 46 before coating. If desired the tape could first be run through the apparatus with its reverse side exposed to the metal vapors and then run through as described. This would produce a tape in which the reverse side in addition to the background areas was coated with evaporated metal. The same result could be obtained by passing the tape through the vacuum chamber in such a way that both sides would be exposed to an evaporating source.

When long lengths of measuring tape are coated in an apparatus as shown in Fig. IV, it may be necessary to degas the tape before coating. If the tape carries excessive quantities of occluded gasses, the pressure will rise as the coating operation is carried out and finally will prevent the evaporated aluminum from reaching the tape. This is necessary when the printing composition contains excessive quantities of volatile matter or when the preliminary treatment given to the surface of the steel imparts a quality to it which causes it to absorb large quantities of gasses. This happens for example when the phosphating treatment is used without removing the phosphate layer in the apparatus of Fig. IV.

Degassing may be accomplished by passing the tape back and forth from reel to reel while the vacuum chamber 24 is under vacuum. In order to do this it will be necessary to provide driving means for the reels which will permit them to run in either direction. The degassing operation may be accelerated by heating the tape as by the induction coil 46 or by providing a high voltage glow discharge source within the chamber 24. If it is desired to prevent deposition on the indicia areas, the degassing procedure must be conducted so as not to remove the volatile constituents of the printing composition which will be relied on for preventing deposition.

The required metal coating may be applied by sputtering as well as by evaporation. However, aluminum does not sputter readily but chromium, nickel and silver may be effectively sputtered. In sputtering measuring tape it is necessary to use all possible means for speeding up the process in order to make the method practical. This is best done by passing the tape through the cathode which may be of tubular construction. Sputtering from the outside surface of the tubular cathode should be prevented as by exposing it to the atmosphere. The cathode should be maintained at a high negative potential with respect to the tape. With a sputtering apparatus constructed in this manner substantially all the discharge and sputtering of metal will proceed from the cathode to the tape itself. The sputtering rate may be increased further by maintaining the cathode at a high temperature and by use of a selected residual atmosphere such as an atmosphere of mercury vapor. The tape may be unreeled in one chamber passed through the cathode and rereeled in a second chamber or the tape may be fed continuously in and out of the vacuum chamber through mercury sealing legs as the sputtering is carried on.

Various modifications of the process herein taught may be used to make a useful measuring tape. It is not intended that the invention should be limited to one or two specific embodiments but is considered to encompass various processes for the manufacture of measuring tapes which include a step of deposition of metal in high vacuum in combination with other necessary steps as are set forth in the appended claim.

What is claimed is:

The method for making measuring tapes comprising the steps of blackening the surface of a steel strip with an alkaline nitrite solution to deposit black reaction products of the steel on the surface of the strip, applying an adherent coating of an organic resinous imprinting composition to selected areas of said blackened surface by means of a printing machine to form accurate indicia on said surface, treating said surface with dilute nitric acid to remove said black reaction products from those areas of the surface not covered by said organic resinous imprinting composition exposing a steel surface of diffuse reflection characteristics in those areas, depositing a layer of aluminum in high vacuum onto said exposed steel surface, the adherent coating of organic resinous imprinting composition serving to prevent the disposition of aluminum on the selected coated colored indicia areas and then treating said strip with an organic solvent to remove said resinous imprinting composition and any overlying aluminum exposing the colored indicia areas against the aluminum background of diffuse reflecting characteristics.

ALLAN R. A. BEEBER.

References Cited in the file of this patent

UNITED STATES PATENTS

| Number | Name | Date |
|---|---|---|
| Re. 23,133 | Keuffel et al. | July 12, 1949 |
| 881,826 | Rabone | Mar. 10, 1908 |
| 1,828,401 | Farrand | Oct. 20, 1931 |
| 2,089,209 | Keuffel et al. | Aug. 10, 1937 |
| 2,139,640 | Mall et al. | Dec. 6, 1938 |
| 2,273,941 | Dorn | Feb. 24, 1942 |
| 2,405,662 | McManus | Aug. 13, 1946 |

FOREIGN PATENTS

| Number | Country | Date |
|---|---|---|
| 11,962 | Great Britain | 1847 |